United States Patent
Toris

(10) Patent No.: US 11,185,060 B2
(45) Date of Patent: Nov. 30, 2021

(54) FISHING LURE WITH MAGNETIC HOLDER TO RELEASABLY RETAIN BELLY HOOK IN STINGER POSITION

(71) Applicant: Georgios G. Toris, Gavle (SE)

(72) Inventor: Georgios G. Toris, Gavle (SE)

(*) Notice: Subject to any disclaimer, the term of this patent is extended or adjusted under 35 U.S.C. 154(b) by 709 days.

(21) Appl. No.: 15/783,764

(22) Filed: Oct. 13, 2017

(65) Prior Publication Data
US 2019/0110453 A1  Apr. 18, 2019

(51) Int. Cl.
*A01K 85/02* (2006.01)
*A01K 85/16* (2006.01)

(52) U.S. Cl.
CPC .............. *A01K 85/02* (2013.01); *A01K 85/16* (2013.01)

(58) Field of Classification Search
CPC ........ A01K 85/02; A01K 85/00; A01K 85/16; A01K 85/18; A01K 83/02
USPC .......... 43/42.45, 42.48, 41, 43.2, 43.4, 42.1, 43/34–37
See application file for complete search history.

(56) References Cited

U.S. PATENT DOCUMENTS

| | | | | |
|---|---|---|---|---|
| 2,102,492 A * | 12/1937 | Stolley | ................... | A01K 85/16 43/42.04 |
| 2,189,958 A * | 2/1940 | Middlemiss | ........... | A01K 85/16 43/42.04 |
| 2,225,676 A * | 12/1940 | White | .................... | A01K 85/16 43/42.05 |
| 2,246,757 A * | 6/1941 | Rosegard | ............... | A01K 85/16 43/42.04 |
| 2,429,339 A * | 10/1947 | Arbogast | ............... | A01K 85/16 43/42.44 |
| 2,459,288 A * | 1/1949 | Robbins | ................. | A01K 85/16 43/42.04 |
| 2,497,473 A * | 2/1950 | Slepica | .................. | A01K 85/16 43/42.04 |

(Continued)

FOREIGN PATENT DOCUMENTS

| | | | | |
|---|---|---|---|---|
| DE | 202013003122 U1 * | 5/2013 | ............. | A01K 85/02 |
| EP | 1523886 A1 * | 4/2005 | ............. | A01K 85/02 |

(Continued)

OTHER PUBLICATIONS

Translation of JP 3194484 (Year: 2014).*

(Continued)

*Primary Examiner* — Darren W Ark
(74) *Attorney, Agent, or Firm* — Glenn E. Gold, P.A.; Glenn E. Gold

(57) ABSTRACT

A fishing lure includes a solid body having a front head portion, a rear tail portion, a top back portion and a bottom belly portion. The fishing lure also includes a cavity recessed within the solid body and having a bottom opening at a location extending between and intermediately of the bottom belly portion and rear tail portion. The fishing lure further includes a magnetic holder disposed in the cavity and assembled relative thereto to provide a channel of diametrically magnetized configuration for receiving and releasably retaining a shank portion of a metal hook coupled at an end to the bottom belly portion and extending within the channel so as to displace a point on an opposite end of the metal hook downwardly and forwardly away from the cavity and thereby in a stinger position relative to the solid body.

7 Claims, 8 Drawing Sheets

(56) References Cited

U.S. PATENT DOCUMENTS

| | | | | |
|---|---|---|---|---|
| 2,517,298 | A | * | 8/1950 | Gaylord .................. A01K 85/16 43/42.47 |
| 2,556,205 | A | * | 6/1951 | McRoberts ............ A01K 85/16 43/42.04 |
| 2,582,627 | A | * | 1/1952 | Gaylord .................. A01K 85/16 43/42.05 |
| 2,746,200 | A | * | 5/1956 | Dale ....................... A01K 85/02 43/42.04 |
| 3,006,100 | A | * | 10/1961 | Zeman ................... A01K 85/02 43/35 |
| 3,902,265 | A | * | 9/1975 | Pond ...................... A01K 85/16 43/42.05 |
| 3,971,151 | A | | 7/1976 | Banner |
| 4,006,551 | A | * | 2/1977 | Messacar ............... A01K 85/16 43/42.04 |
| 4,819,363 | A | * | 4/1989 | Parsonage ............. A01K 85/16 43/42.4 |
| 4,823,503 | A | * | 4/1989 | Tesch ..................... A01K 85/16 43/42.04 |
| 4,827,656 | A | | 5/1989 | Ohnishi |
| 4,878,310 | A | * | 11/1989 | Hannon ................. A01K 85/02 43/42.04 |
| 4,881,339 | A | * | 11/1989 | Wirkus .................. A01K 85/02 43/42.04 |
| 4,920,685 | A | * | 5/1990 | Landuydt .............. A01K 85/02 43/42.04 |
| 4,922,645 | A | * | 5/1990 | Hannon ................. A01K 85/02 43/42.4 |
| 5,117,574 | A | * | 6/1992 | Perry ..................... A01K 85/18 43/42.06 |
| 5,564,215 | A | | 10/1996 | Phelps |
| 5,887,377 | A | * | 3/1999 | Birko ..................... A01K 85/02 43/34 |
| 6,176,033 | B1 | | 1/2001 | Latwesen |
| 6,308,453 | B1 | | 10/2001 | Meyer |
| 7,107,718 | B1 | * | 9/2006 | Alajajyan .............. A01K 85/02 43/42.04 |
| 7,152,359 | B1 | | 12/2006 | Adams |
| 7,299,583 | B2 | * | 11/2007 | Adams ................... A01K 97/06 43/25.2 |
| 7,356,963 | B2 | * | 4/2008 | Scott ...................... A01K 85/18 43/42.04 |
| D589,587 | S | * | 3/2009 | Stacy .......................... D22/144 |
| 7,788,844 | B1 | | 9/2010 | Ruzicka |
| 8,689,479 | B1 | * | 4/2014 | Smith .................... A01K 85/02 43/37 |
| 8,904,700 | B1 | | 12/2014 | Kacines |
| 8,925,241 | B1 | * | 1/2015 | Smith .................... A01K 85/02 43/37 |
| 9,101,122 | B2 | * | 8/2015 | Odem .................... A01K 85/02 |
| 10,477,844 | B2 | * | 11/2019 | Low ....................... A01K 85/02 |
| 2014/0033602 | A1 | | 2/2014 | Gesik |
| 2014/0259870 | A1 | | 9/2014 | Odem |
| 2016/0037758 | A1 | | 2/2016 | Low |

FOREIGN PATENT DOCUMENTS

| | | | | |
|---|---|---|---|---|
| GB | 2566698 | A | * | 3/2019 ............. A01K 85/02 |
| JP | 6026152 | Y2 | * | 7/1994 |
| JP | 10248443 | A | | 9/1998 |
| JP | 2001321023 | A | | 11/2001 |
| JP | 2001321023 | A | * | 11/2001 |
| JP | 2002238402 | A | * | 8/2002 |
| JP | 2002330672 | A | * | 11/2002 |
| JP | 2003000104 | A | * | 1/2003 |
| JP | 2003079278 | A | * | 3/2003 |
| JP | 2003134968 | A | * | 5/2003 |
| JP | 2004073158 | A | * | 3/2004 |
| JP | 2004337063 | A | * | 12/2004 |
| JP | 2004337063 | A | | 12/2004 |
| JP | 2004337076 | A | * | 12/2004 |
| JP | 2005237355 | A | * | 9/2005 |
| JP | 2006197877 | A | * | 8/2006 |
| JP | 2007209229 | A | * | 8/2007 |
| JP | 2008035711 | A | * | 2/2008 |
| JP | 2008113647 | A | * | 5/2008 |
| JP | 2010022306 | A | * | 2/2010 |
| JP | 2012024064 | A | * | 2/2012 |
| JP | 2012139188 | A | * | 7/2012 |
| JP | 3194484 | U | * | 11/2014 |
| JP | 2015019600 | A | * | 2/2015 |
| JP | 3209829 | U | * | 4/2017 |
| JP | 2017079625 | A | * | 5/2017 |
| JP | 3210806 | U | * | 6/2017 |
| JP | 2017158444 | A | * | 9/2017 |
| JP | 6322491 | B2 | * | 5/2018 |
| JP | 2019017296 | A | * | 2/2019 |
| JP | 2019176772 | A | * | 10/2019 |
| WO | WO-9207462 | A1 | * | 5/1992 ............. A01K 85/16 |

OTHER PUBLICATIONS

Translation of JP 2001-321023 (Year: 2001).*
Translation of JP 2004-337063 (Year: 2004).*
Pub. No. EP3469893, App. No. EP18196736, European Search Report, pp. 1-2.

* cited by examiner

US 11,185,060 B2

FISHING LURE WITH MAGNETIC HOLDER TO RELEASABLY RETAIN BELLY HOOK IN STINGER POSITION

FIELD OF THE INVENTION

The present invention relates to protecting a fishing lure that is damaged by the point of a belly hook, and is more particularly concerned with a fishing lure incorporating a magnetic holder to releasably retain a belly hook in a stinger position.

BACKGROUND OF THE INVENTION

Fishing lures are typically attached to a fishing line and pulled through water by a fisherman on a boat traveling at trolling speeds of approximately seven knots or more. A prior art fishing lure, such as a swimming type hard body trolling lure 400 shown in FIG. 3, may 'swim' through the water with its body 402 moving or rolling from side to side and may have a hook 404 disposed below and flexibly linked to the bottom of a belly 406 of the lure body 402.

The flexible linkage of the hook 404 to the belly 406 of the lure body 402 poses a problem in that the hook is allowed to pivot in all directions relative to the lure body. At the normal and high trolling speeds the flexible linkage enables the point 408 of the hook to prod and slash the sides of the lure body 402 at a high rate, consequently 'eating' away and damaging the plastic or wooden material, such as at site 410, of the lure body 402, thereby rendering the lure useless. Several prior art approaches that have been tried to overcome this problem involve tying a butcher string or placing a rubber band around the belly hook and the lure, thereby fixing the belly hook to the lure belly. However, these approaches have resulted in many occasions to degrade the motion of the lure through the water.

Accordingly, there remains a need that has yet not been fulfilled in the art for an innovation that will overcome the aforementioned deficiencies of the known prior art and problems that remain unsolved.

SUMMARY OF THE INVENTION

The present invention is directed to an innovation that overcomes the deficiencies of the known prior art and the problems that remain unsolved by providing a fishing lure that incorporates a magnetic holder to releasably retain a belly hook in a stinger position in relation to the direction that the lure is being pulled through the water. In the stinger position, the point and barb of the hook are generally pointing forwardly and downwardly, making it much easier to 'hook' a striking fish.

In one aspect of the present invention, a fishing lure includes:
  a body having a front head portion, a rear tail portion, a top back portion, and a bottom belly portion;
  a cavity recessed within the body and having a bottom opening at a location extending between and intermediately of the bottom belly portion and the rear tail portion of the body; and
  a magnetic holder disposed in the cavity and assembled relative thereto to provide a channel of diametrically magnetized configuration aligned with the bottom opening of the cavity for receiving and releasably retaining a shank portion of a metal hook coupled at an end to the bottom belly portion of the body and extending within the channel so as to displace a point on an opposite end of the metal hook downwardly and forwardly away from the cavity and thereby in a stinger position relative to the body.

In another aspect of the present invention, a first embodiment of the fishing lure includes:
  the cavity having
    a pair of outer side walls spaced apart from each other,
    a pair of inner side walls spaced apart from each other and spaced inwardly from and offset above the pair of outer side walls,
    a pair of outer top walls extending between and interconnecting upper edges of the pair of outer side walls with lower edges of the pair of inner side walls,
    an inner top wall extending between and interconnecting upper edges of the pair of inner side walls, and
    a pair of end walls spaced apart from each other and disposed at opposite ends of the outer and inner side walls and the outer and inner top walls; and
  the magnetic holder having
    a pair of elongated side bars spaced apart from each other and being of rectangular configuration, each of the elongated side bars having
      an outer side wall extending along one of the outer side walls of said cavity and between the end walls of said cavity,
      an inner side wall spaced from the outer side wall of each elongated side bar and extending between the end walls of the cavity,
      a top wall extending between and interconnecting upper edges of the outer and inner side walls of each elongated side bar and extending along and below the top wall of the cavity and between the end walls of the cavity,
      a bottom wall spaced apart from the top wall of each elongated side bar and extending between and interconnecting lower edges of the outer and inner side walls of each elongated side bar and extending between the end walls of the cavity, and
      a pair of end walls spaced apart from each other and disposed at opposite ends of the outer and inner side walls and top and bottom walls of each elongated side bar and disposed at the pair of end walls of the cavity; and
    an elongated top bar of rectangular configuration, the elongated top bar having
      a pair of opposite side walls spaced from each other and extending along the inner side walls of the cavity and between the end walls of the cavity,
      a top wall extending between and interconnecting upper edges of the opposite side walls of the elongated top bar and disposed below and extending along the inner top wall of the cavity and between the end walls of the cavity,
      a bottom wall spaced from the top wall of the elongated top bar and extending between and interconnecting lower edges of the opposite side walls of the elongated top bar and extending between the end walls of the cavity, and
      a pair of end walls spaced apart from each other and disposed at opposite ends of the opposite side walls and the top and bottom walls of the elongated top bar and disposed at the pair of end walls of the cavity;
    wherein the top bar is assembled between and offset above the pair of elongated side bars so as to define between the end walls of the cavity, the inner side walls of the elongated side bars and below the bottom wall of the elongated top bar the channel aligned with the bottom opening of the cavity for receiving and releasably retaining the shank portion of the metal hook.

In another aspect of the present invention, a second embodiment of the fishing lure includes:
the cavity having
a pair of side walls spaced apart from each other,
a top wall extending between and interconnecting upper edges of the pair of side walls, and
a pair of end walls spaced apart from each other and disposed at opposite ends of the side walls and the top wall; and
the magnetic holder having
a pair of elongated side bars spaced apart from each other and being of rectangular configuration, each of the elongated side bars having
an outer side wall extending along one of the side walls of the cavity and between the end walls of the cavity,
an inner side wall spaced from the outer side wall of each elongated side bar and extending between the end walls of the cavity,
a top wall extending between and interconnecting upper edges of the outer and inner side walls of each elongated side bar and extending along and below the top wall of the cavity and between the end walls of the cavity,
a bottom wall spaced apart from the top wall of each elongated side bar and extending between and interconnecting lower edges of the outer and inner side walls of each elongated side bar and extending between the end walls of the cavity, and
a pair of end walls spaced apart from each other and disposed at opposite ends of the outer and inner side walls and the top and bottom walls of each elongated side bar and disposed at the pair of end walls of the cavity;
wherein the cavity between the end walls thereof and below the top wall thereof and each of the elongated side bars between the inner side walls thereof define the channel aligned with the bottom opening of the cavity for receiving and releasably retaining the shank portion of the metal hook.

In another aspect of the present invention, a third embodiment of the fishing lure includes:
the cavity having
a pair of side walls spaced apart from each other,
a top wall extending between and interconnecting upper edges of the pair of side walls, and
a pair of end walls spaced apart from each other and disposed at opposite ends of the side walls and the top wall; and
the magnetic holder having
an elongated bar of rectangular configuration, the elongated bar having
a pair of opposite side walls spaced apart from each other and extending along the side walls of the cavity,
a top wall extending between and interconnecting upper ends of the opposite side walls of the elongated bar and extending along and below the top wall of the cavity and between the end walls of the cavity,
a pair of bottom walls spaced from the top wall of the elongated bar and extending along and connected with a lower edge of one of the opposite side walls of the elongated bar and extending between the end walls of said cavity,
a pair of end walls spaced apart from each other and disposed at opposite ends of the opposite side walls and the top and bottom walls of the elongated bar and disposed at the pair of end walls of the cavity, and
an inner wall of a semi-cylindrical configuration recessed into the elongated bar and extending from inner edges of the bottom walls and inner edges of the end walls of the elongated bar and spaced from the top wall and extending between the end walls of the cavity so as to define the channel aligned with the bottom opening of the cavity for receiving and releasably retaining the shank portion of the metal hook.

In another aspect of the present invention, a fishing lure includes:
a solid body having a front head portion, a rear tail portion, a top back portion, and a bottom belly portion;
a top eye attached to and extending above the top back portion of the solid body at a location spaced from and intermediately between the front head portion and the rear tail portion of the solid body;
a bottom eye attached to and extending below the bottom belly portion of the solid body at a location opposite from the top eye and spaced from and intermediately between the front head portion and said rear tail portion of the solid body;
a cavity recessed within the solid body and having a bottom opening at a location extending between and intermediately of the bottom belly portion and the rear tail portion of the solid body; and
a magnetic holder disposed in the cavity and assembled relative thereto to provide a channel of diametrally magnetized configuration aligned with the bottom opening of the cavity for receiving and releasably retaining a shank portion of a metal hook coupled at an end on the bottom eye and extending within the channel so as to displace a barbed portion of the metal hook and a point defined by the barbed portion downwardly and forwardly away from the cavity and thereby in a stinger position relative to the solid body.

In another aspect of the present invention, a fishing lure includes:
a solid body having a front head portion, a rear tail portion, a top back portion, and a bottom belly portion such that a longitudinal axis extends between the front head portion and the rear tail portion of the solid body and a pair of orthogonal transverse axes extend across the solid body proximate the top back portion and the bottom belly portion thereof;
a top eye attached to and extending above the top back portion of the solid body at a location spaced from and intermediately between the front head portion and the rear tail portion of the solid body, the top eye for connecting a fishing line to the solid body;
a bottom eye attached to and extending below the bottom belly portion of the solid body at a location opposite from the top eye and spaced from and intermediately between the front head portion and the rear tail portion of the solid body;
a metal hook having
at least one shank portion coupled at one end on the bottom eye and extending therefrom, and a barbed portion at a terminal end of the shank portion and having a point opposite the one end of the shank portion;

a cavity recessed within the solid body and having a bottom opening at a location extending between and intermediately of the bottom belly portion and the rear tail portion of the solid body, the cavity extending length-wise in parallel with the longitudinal axis of the solid body and the cavity also extending width-wise and height-wise in parallel with the orthogonal transverse axes of the solid body; and a magnetic holder disposed in the cavity and assembled relative thereto to provide a channel of diametrically magnetized configuration aligned with the bottom opening of the cavity for receiving and releasably retaining the shank portion of the metal hook extending within the channel so as to displace the barbed portion of the metal hook and the point defined by the barbed portion downwardly and forwardly away from the cavity and thereby in a stinger position relative to the solid body.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
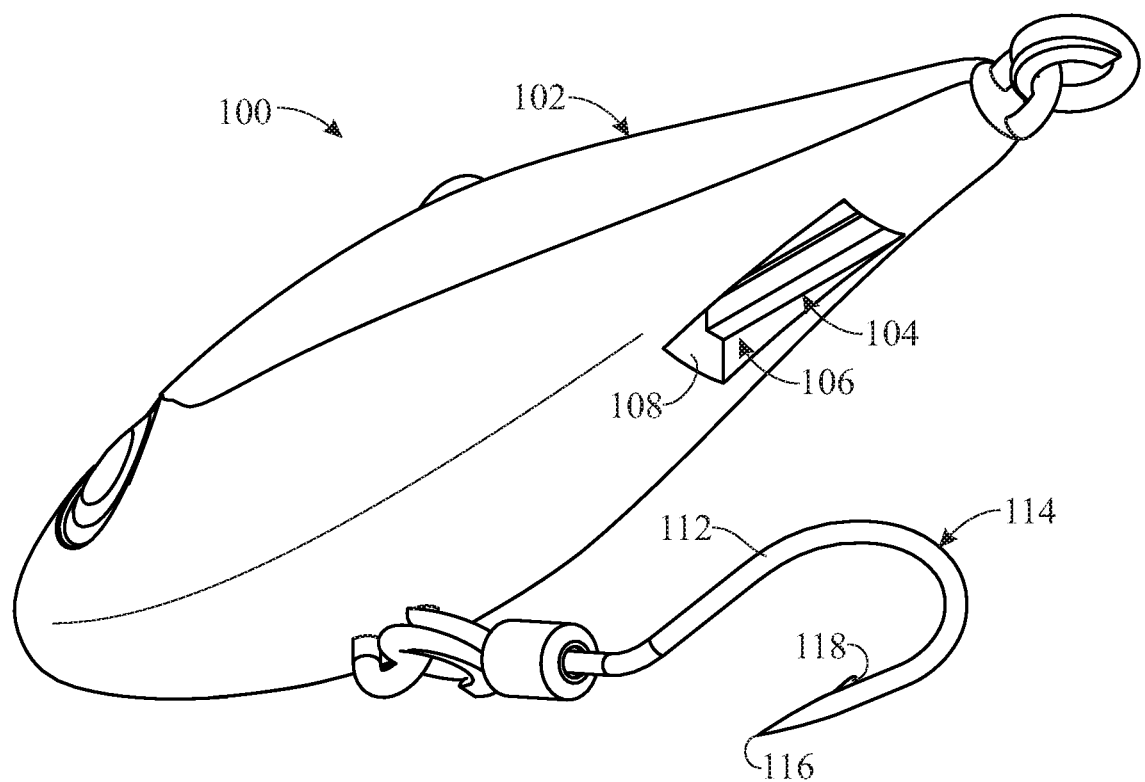
FIG. 1 presents an assembled bottom isometric view of a first exemplary embodiment of a fishing lure incorporating a magnetic holder in a cavity recessed in a bottom of the fishing lure in accordance with aspects of the present invention, with a belly hook shown displaced from the magnetic holder.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 5:
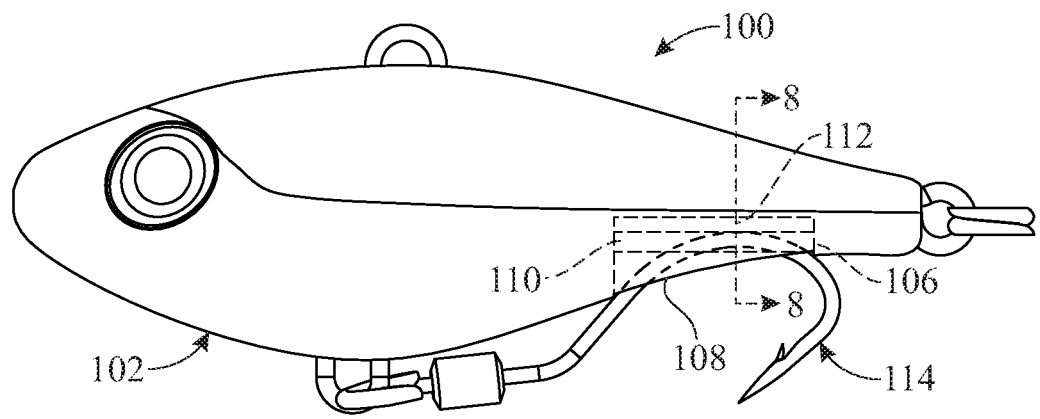
FIG. 5 presents a side elevation view of the fishing lure showing in dashed outline form the magnetic holder and cavity as shown in FIG. 4 with the belly hook now releasably retained by the magnetic holder in the cavity.

Referring now to FIGS. 1, 2, 4, 5 and 8, there is illustrated a first exemplary embodiment of a fishing lure, generally designated reference numeral 100, in accordance with aspects of the present invention. The fishing lure 100 includes a body 102, such as of solid construction, incorporating a magnetic holder 104 in a cavity 106 of the body. The magnetic holder 104 is disposed in the cavity 106 and assembled relative thereto and oriented relative to a bottom opening 108 of the cavity to provide a channel 110 of diametrically magnetized configuration for releasably retaining a shank portion 112 of a metal belly hook 114 coupled at one end to the body 102 and extending within the channel to as to displace a point 116 on a barbed portion 118 of the metal hook downwardly and forwardly away from the cavity and thereby in a stinger position relative to the body, as seen in FIG. 5.

The body 102 of the fishing lure 100 may have a front head portion 120, a rear tail portion 122, a top back portion 124, and a bottom belly portion 126, with reference to the body being in a swimming orientation and pulled through water. The cavity 106 is recessed within the body 102 and, together with its bottom opening 108, is defined at a location extending between and intermediately of the rear tail portion 122 and the bottom belly portion 126 of the body. The cavity 106 may extend length-wise in parallel with a longitudinal axis 128 of the body 102 extending between the front head portion 120 and the rear tail portion 122 thereof. The cavity 106 may also extend width-wise and height-wise in parallel with a pair of orthogonal transverse axes 130, 132 of body 102 extending width-wise and height-wise across the body proximate the top back portion 124 and the bottom belly portion 126 thereof.

Additionally, the fishing lure 100 may have a top eye 134 attached to and extending above the top back portion 124 of the body 102 at a location spaced from and intermediately between the front head portion 120 and the rear tail portion 122 of the body. The top eye 134 may connect the fishing lure 100 with a fishing line (not shown). The fishing lure 100 may also have a bottom eye 136 attached to and extending below the bottom belly portion 126 of the body 102 at a location opposite from the top eye 134 and spaced from and intermediately between the front head portion 120 and the rear tail portion 122 of the body. The bottom eye 136 may be coupled with the shank portion 112 of the metal belly hook 114. The fishing lure 100 may further have a rear eye 138 attached to and extending from the rear tail portion 122. The rear eye 138 may be coupled with another hook (not shown).

Figure 2:
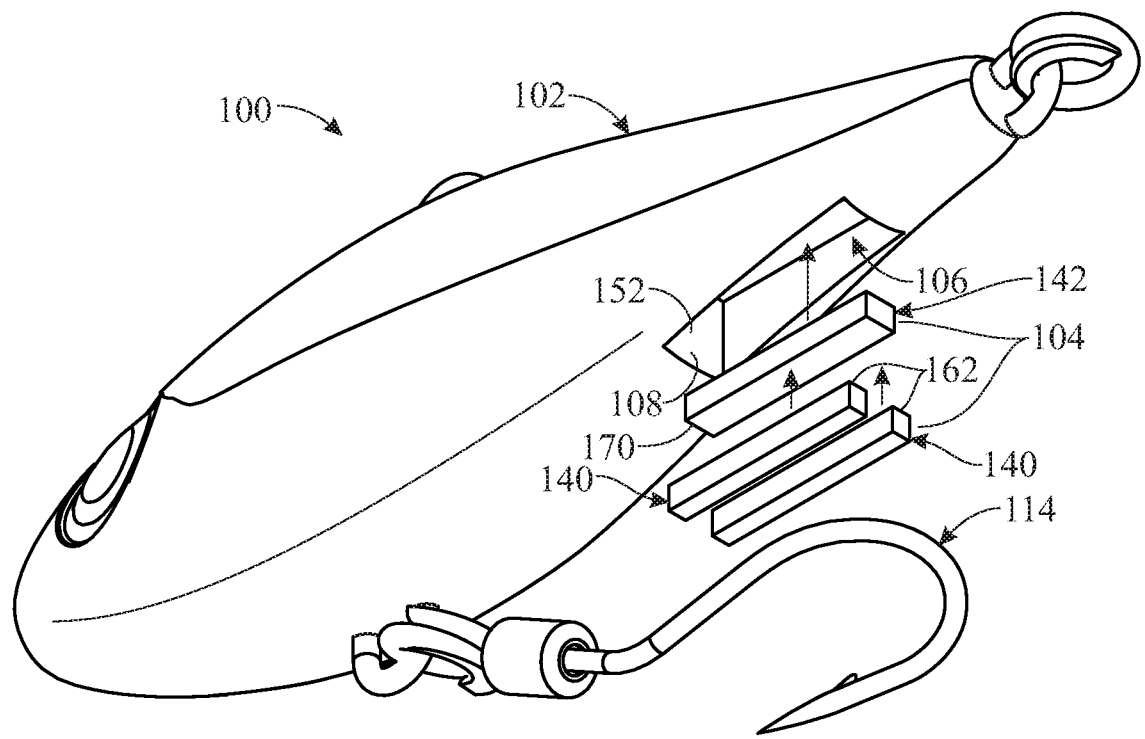
FIG. 2 presents an exploded bottom isometric view of the fishing lure originally introduced in FIG. 1, showing the magnetic holder removed from the cavity recessed in the bottom of the fishing lure.
Figure 3:
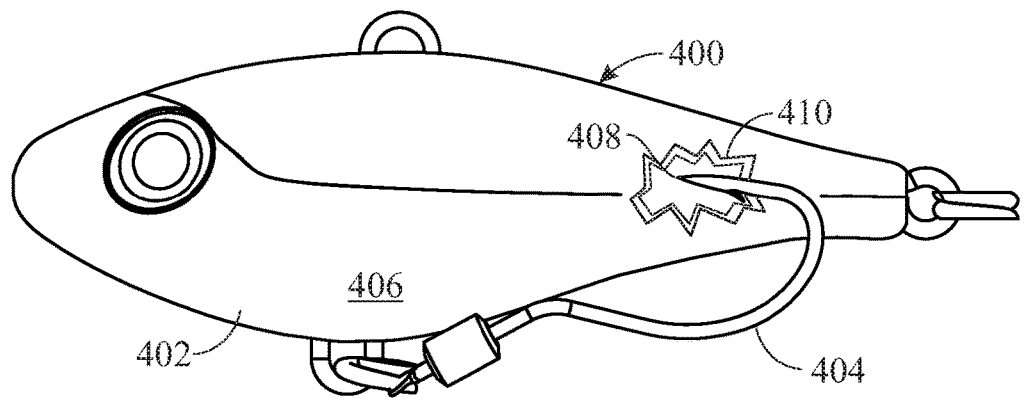
FIG. 3 presents a side elevation view of a prior art fishing lure depicting damage that frequently is caused to the body of the lure by the point of a belly hook.
Figure 4:
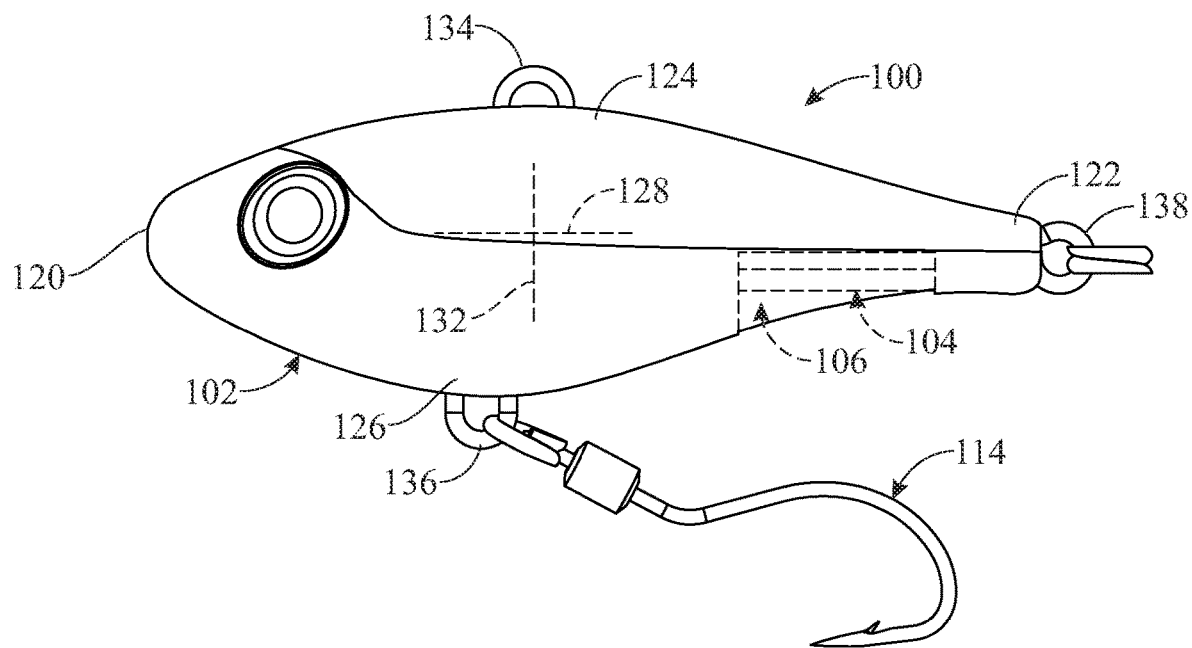
FIG. 4 presents an assembled side elevation view of the fishing lure originally introduced in FIG. 1, showing in dashed outline form the magnetic holder and cavity of the lure.
Figure 8:
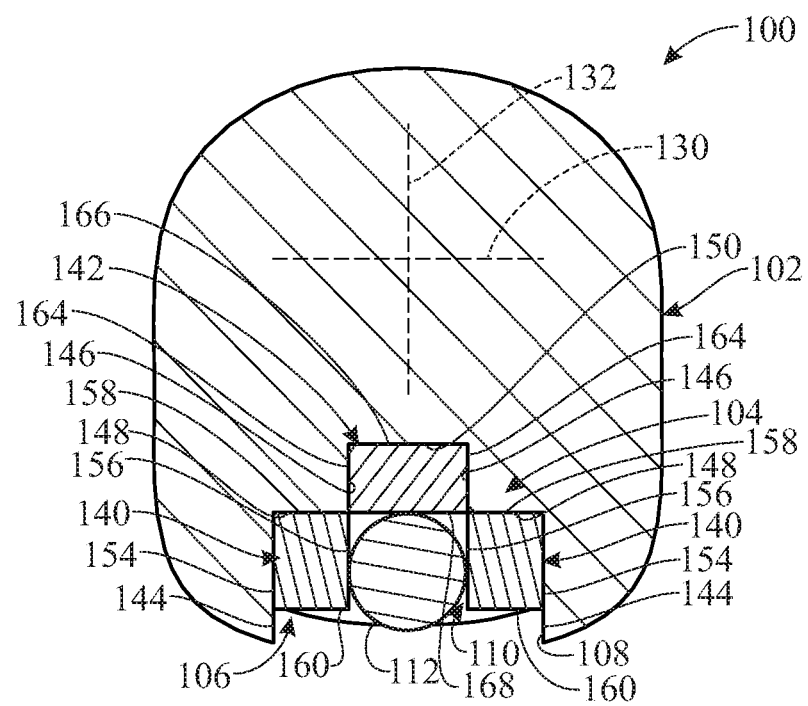
FIG. 8 presents an enlarged cross-section view of the first exemplary embodiment of the fishing lure, showing the magnetic holder and cavity as seen along section line 8-8 of FIG. 5.

Referring to FIGS. 2 and 8, in the first exemplary embodiment of the fishing lure 100, the magnetic holder 104 includes a pair of elongated side bars 140 and an elongated top bar 142. Each of the elongated bars 140, 142 may have a rectangular configuration. As mentioned above, the elongated side bars 140 and elongated top bar 142 may be assembled together in the cavity 106 to provide the channel 110 with a diametrically magnetized configuration. More particularly, the cavity 106 includes a pair of outer side walls 144, a pair of inner side walls 146, a pair of outer top walls 148, an inner top wall 150, and a pair of end walls 152. The outer side walls 144 are spaced apart from each other and extend in parallel with the longitudinal axis 128 of the body 102. The inner side walls 146 are spaced apart from each other and spaced inwardly from and offset above the outer side walls 144 and extend in parallel with the longitudinal axis 128 of the body 102. The outer top walls 148 extend between and interconnect upper edges of the outer side walls 144 with lower edges of the inner side walls 146 and extend in parallel with the longitudinal axis 128 of the body 102. The inner top wall 150 extends between and interconnects upper edges of the inner side walls 146 and extends in parallel with the longitudinal axis 128 of the body 102. The end walls 152 are spaced apart from each other and disposed at opposite ends of the outer and inner side walls 144, 146 and the outer and inner top walls 148, 150. Also, the end walls 152 extend in parallel with the orthogonal transverse axes 130, 132 of the body 102.

The elongated side bars 140 of the magnetic holder 104 are spaced apart from each other. Each elongated side bar 140 has an outer side wall 154, an inner side wall 156, a top wall 158, a bottom wall 160 and a pair of end walls 162. The outer side wall 154 of each elongated side bar 140 extends along one of the outer side walls 144 of the cavity 106 and between the end walls 152 of the cavity. The inner side wall 156 of each elongate side bar 140 is spaced from the outer side wall 154 and extends between the end walls 152 of the cavity 106. The top wall 158 of each elongated side bar 140 extends between and interconnects upper edges of the outer and inner side walls 154, 156 and extends along and below one of the outer top walls 148 of the cavity 106 and between the end walls 152 of the cavity. The bottom wall 160 of each elongated side bar 140 is spaced apart from the top wall 158 and extends between and interconnects lower edges of the outer and inner side walls 154, 156 and extends between the end walls 152 of the cavity 106. The end walls 162 of each elongated side bar 140 are spaced from each other and disposed at opposite ends of the outer and inner side walls 154, 156 and top and bottom walls 158, 160 and also disposed at the pair of end walls 152 of the cavity 106.

The elongated top bar 142 of the magnetic holder 104 has a pair of opposite side walls 164, a top wall 166, a bottom wall 168 and a pair of end walls 170. The opposite side walls 164 of the elongated top bar 142 are spaced from each other and extend along the inner side walls 146 of the cavity 106 and between the end walls 152 of the cavity. The top wall 164 of the elongated top bar 142 extends between and interconnects upper edges of the opposite side walls 162 and is disposed below and extends along the inner top wall 150 of the cavity 106 and between the end walls 152 of the cavity. The bottom wall 168 of the elongated top bar 142 is spaced from the top wall 166 and extends between and interconnects lower edges of the opposite side walls 164 and extends between the end walls 152 of the cavity 106. The end walls 170 of the elongated top bar 142 are spaced apart from each other and disposed at opposite ends of the opposite side walls 164 and the top and bottom walls 166, 168 and disposed at the pair of end walls 152 of the cavity 106. The elongated top bar 142 is assembled between and offset above the pair of elongated side bars 140 so as to define between the end walls 152 of the cavity 106, the inner side walls 156 of the elongated side bars 140 and below the bottom wall 168 of the elongated top bar 142 the channel 110 aligned with the bottom opening 108 of the cavity 106 for receiving and releasably retaining the shank portion 112 of the metal belly hook 114.

Figure 6:
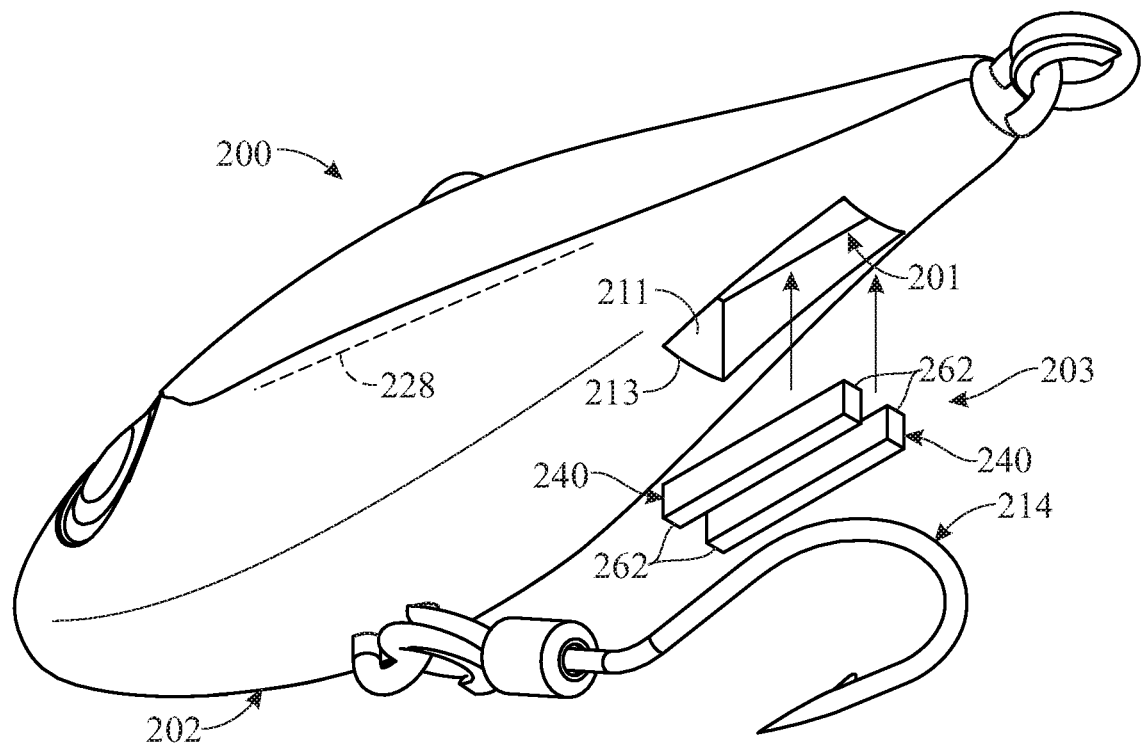
FIG. 6 presents an exploded bottom isometric view of a second exemplary embodiment of a fishing lure, showing a modified magnetic holder removed from a modified cavity recessed in the bottom of the fishing lure.
Figure 9:
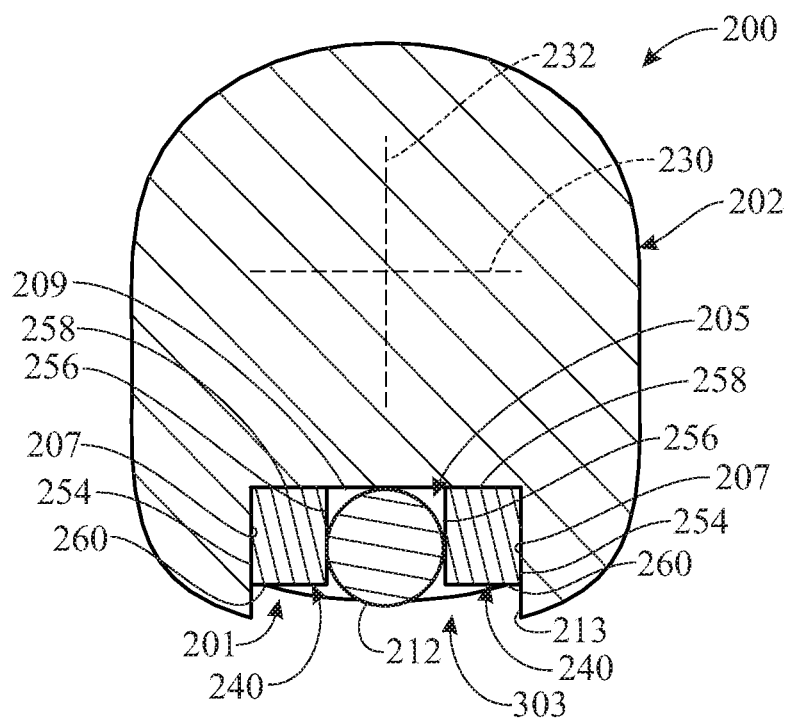
FIG. 9 presents an enlarged cross-section view of the second exemplary embodiment of the fishing lure, showing the modified magnetic holder and cavity of FIG. 6.

Turning now to FIGS. 6 and 9, there is illustrated a second exemplary embodiment of a fishing lure, generally designated reference numeral 200, generally the same as the first exemplary embodiment except for certain modifications which are described hereinafter. The same reference numerals, except for a change in the prefix of the reference numerals from "1" to "2", will indicate the same components in the second exemplary embodiment as in the first exemplary embodiment and thus these same components need not be described in detail in the following detailed description of the second exemplary embodiment in order to gain a complete understanding of the modified components of the fishing lure. Only the modifications will be identified with new reference numerals. The modifications of the fishing lure 200 are incorporated by the cavity 201 and the magnetic holder 203 in accordance with aspects of the present invention. The magnetic holder 203 includes a pair of elongated side bars 240 being substantially the same as the pair of elongated side bars 140 as previously described. The elongated side bars 240 may be assembled in the cavity 201 to provide a channel 205 with a diametrically magnetized configuration.

More particularly, the cavity 201 includes a pair of side walls 207, a top wall 209 and a pair of end walls 211. The side walls 207 of the cavity 201 are spaced apart from each other and may extend in parallel with the longitudinal axis 228 of the body 202. The top wall 209 of the cavity 201 extends between and interconnects upper edges of the side walls 207. The top wall 209 may extend in parallel with the longitudinal axis 228 of the body 202. The end walls 211 of the cavity 201 are spaced apart from each other and disposed at opposite ends of the side walls 207 and top wall 209. Also, the end walls 211 may extend in parallel with the orthogonal transverse axes 230, 232 of the body 202.

Each of the elongated side bars 240 of the magnetic holder 203 has an outer side wall 254, an inner side wall 256, a top wall 258, a bottom wall 260 and a pair of end walls 262. The outer side wall 254 of each elongated side bar 240 extends along one of the side walls 207 of the cavity 201 and between the end walls 211 of the cavity. The inner side wall 256 of each elongated side bar 240 is spaced from the outer side wall 254 and extends between the end walls 211 of the cavity 201. The top wall 258 of each elongated side bar 240 extends between and interconnects upper edges of the outer and inner side walls 254, 256 and extends along and below the top wall 209 of the cavity 201 and between the end walls 211 of the cavity 201. The bottom wall 260 of each elongated side bar 240 is spaced apart from the top wall 258 and extends between and interconnects lower edges of the outer and inner side walls 254, 256 and extends between the end walls 211 of the cavity 201. The end walls 262 of each elongated side bar 240 are spaced apart from each other and disposed at opposite ends of the outer and inner side walls 256, 258 and the top and bottom walls 258, 260 and also disposed at the end walls 211 of the cavity 201. The cavity 201 between the end walls 211 thereof and below the top wall 209 thereof and each of elongated side bars 240 between the inner side walls 258 thereof define the channel 205 aligned with a bottom opening 213 of the cavity 201 for receiving and releasably retaining the shank portion 212 of the metal belly hook 214.

Figure 7:
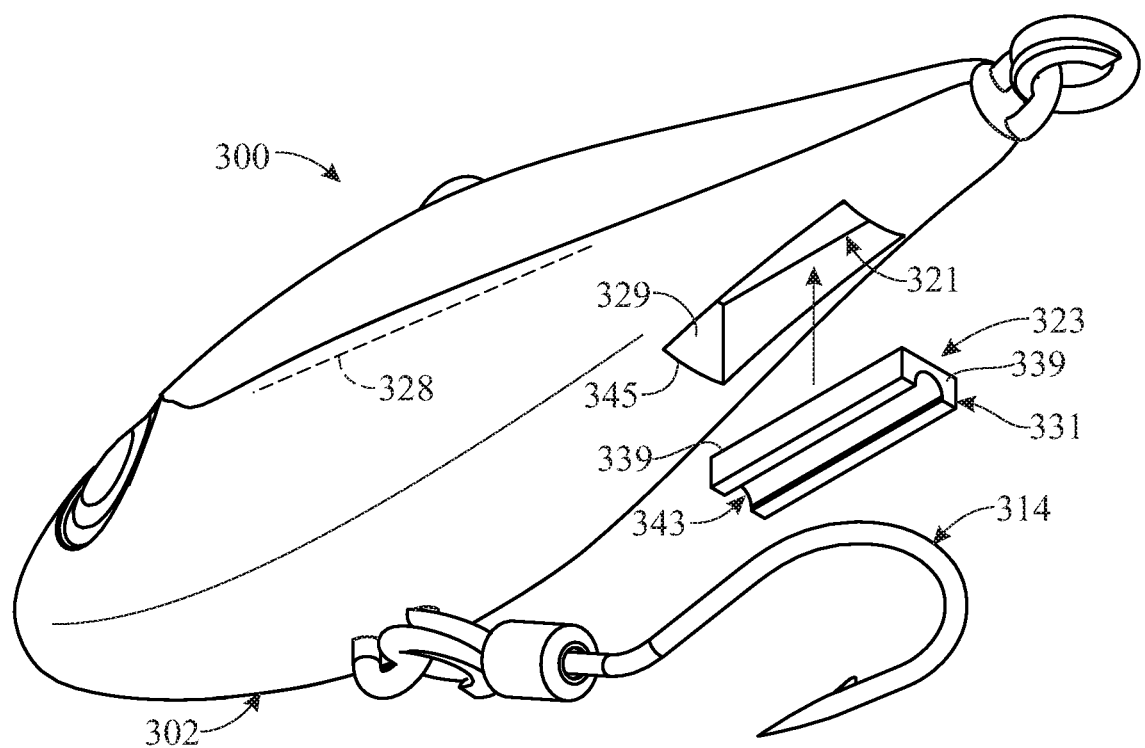
FIG. 7 presents an exploded bottom isometric view of a third exemplary embodiment of a fishing lure, showing a further modified magnetic holder removed from a further modified cavity recessed in the bottom of the fishing lure.
Figure 10:
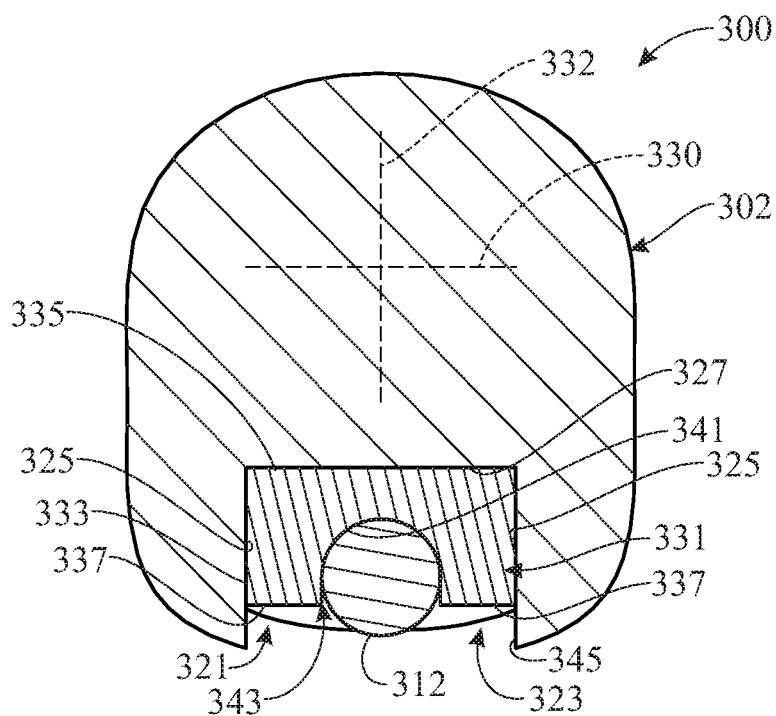
FIG. 10 presents an enlarged cross-section view of the third exemplary embodiment of the fishing lure, showing the further modified magnetic holder and cavity of FIG. 7.

Referring now to FIGS. 7 and 10, there is illustrated a third exemplary embodiment of a fishing lure, generally designated reference numeral 300, generally the same as the first exemplary embodiment except for certain modifications which are described hereinafter. The same reference numerals, except for a change in the prefix of the reference numerals from "1" to "3", will indicate the same components in the third exemplary embodiment as in the first exemplary embodiment and thus these same components need not be described in detail in the following detailed description of the third exemplary embodiment in order to gain a complete understanding of the modified components of the fishing lure. Only the modifications will be identified with new reference numerals. The modifications of the fishing lure 300 are incorporated by the cavity 321 and the magnetic holder 323 in accordance with aspects of the present invention.

More particularly, the cavity 321 includes a pair of side walls 325, a top wall 327 and a pair of end walls 329. The side walls 325 of the cavity 321 are spaced apart from each other and may extend in parallel with the longitudinal axis 328 of the body 302. The top wall 327 of the cavity 321 extends between and interconnects upper edges of the side walls 325. The top wall 327 may extend in parallel with the longitudinal axis 328 of the body 302. The end walls 329 of the cavity 321 are spaced apart from each other and disposed at opposite ends of the side walls 325 and the top wall 327. Also, the end walls 329 may extend in parallel with the orthogonal transverse axes 330, 332 of the body 302.

The magnetic holder 323 is an elongated bar 331 of rectangular configuration having a pair of opposite side walls 333, a top wall 335, a pair of bottom walls 337, a pair of end walls 339 and an inner wall 341. The opposite side walls 333 of the elongated bar 331 are spaced apart from each other and extending along the side walls 325 of the cavity 321. The top wall 335 of the elongated bar 331 extends between and interconnects upper ends of the opposite side walls 333 and extends along and below the top wall 327 of the cavity 321 and between the end walls 329 of the cavity 321. The bottom walls 337 of the elongated bar 331 are spaced from the top wall 335 and extend along and connect with a lower edge of one of the opposite side walls 333 and extend between the end walls 329 of the cavity 321. The inner wall 341 of the elongated bar 331 is of a semi-cylindrical configuration recessed into the elongated bar 331. The inner wall 341 extends from inner edges of the bottom walls 337, is spaced from the top wall 335 and extends between the end walls 329 of the cavity 321 so as to define an elongated diametrically magnetized channel 343 aligned with a bottom opening 345 of the cavity 321 for receiving and releasably retaining the shank portion 312 of the metal belly hook 314.

Figure 11:
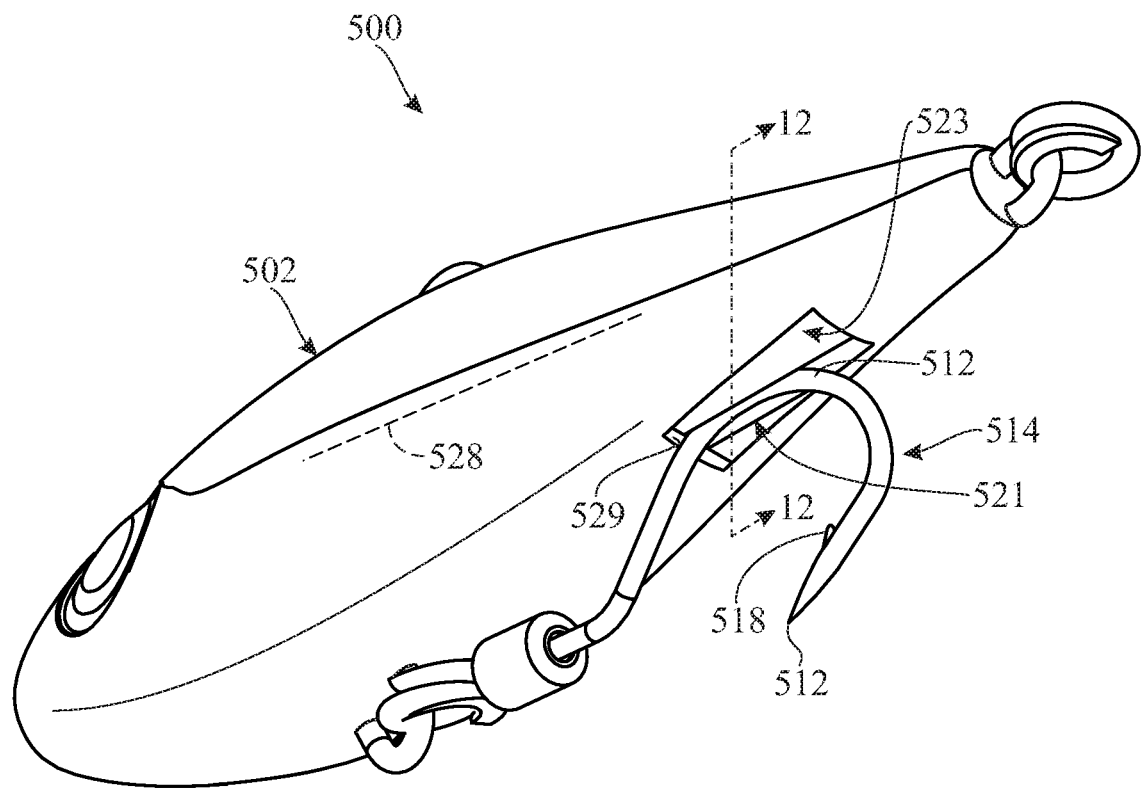
FIG. 11 presents an assembled bottom isometric view of a fourth exemplary embodiment of a fishing lure incorporating a magnetic holder in a cavity recessed in a bottom of the fishing lure in accordance with aspects of the present invention, with the belly hook releasably retained by the magnetic holder in the cavity.
Figure 12:
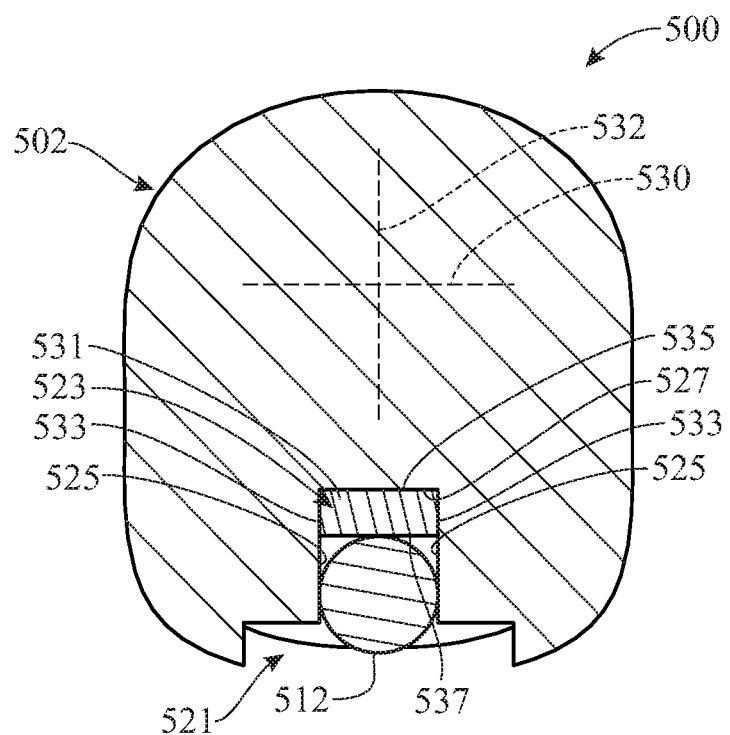
FIG. 12 presents an enlarged cross-section view of the fourth exemplary embodiment of the fishing lure, showing the magnetic holder and cavity as seen along section line 12-12 of FIG. 11.

Referring now to FIGS. 11 and 12, there is illustrated a fourth exemplary embodiment of a fishing lure, generally designated reference numeral 500, generally the same as the first exemplary embodiment except for certain modifications which are described hereinafter. The same reference numerals, except for a change in the prefix of the reference numerals from "1" to "5", will indicate the same components in the fourth exemplary embodiment as in the first exemplary embodiment and thus these same components need not be described in detail in the following detailed description of the fourth exemplary embodiment in order to gain a complete understanding of the modified components of the fishing lure. Only the modifications will be identified with new reference numerals. The modifications of the fishing lure 500 are incorporated by the cavity 521 and the magnetic holder 523 in accordance with aspects of the present invention.

More particularly, the cavity 521 includes a pair of side walls 525, a top wall 527 and a pair of end walls 529. The side walls 525 of the cavity 521, generally constructed of a plastic material, such as polycarbonate, are spaced apart from each other and may extend in parallel with longitudinal axis 528 of the body 502. The top wall 527 of the cavity 521 extends between and interconnects upper edges of the side walls 525. The top wall 527 may extend in parallel with the longitudinal axis 528 of the body 502. The end walls 529 of the cavity 521 are spaced apart from each other and disposed at opposite ends of the side walls 525 and the top wall 527. Also, the end walls 529 may extend in parallel with the orthogonal transverse axes 530, 532 of the body 502. The narrower appearing sidewalls 525 of the cavity 521 of the body 502 help absorb both the torque and friction exerted by the metal belly hook 514 when hooked to a fish.

The magnetic holder 523 is an elongated bar 531 of rectangular configuration having a pair of opposite side walls 533, a top wall 535, a bottom wall 537, and a pair of end walls. The opposite side walls 533 of the elongated bar 531 are spaced-apart from each other and extending along the side walls 525 of the cavity 521. The top wall 535 of the elongated bar 531 extends between and interconnects upper ends of the opposite side walls 533 and extends along and below the top wall 527 of the cavity 521 and between the end walls 529 of the cavity 521. The bottom wall 537 of the elongated bar 531 is spaced apart from the top wall 535 and extends along and connects with a lower edge of one of the opposite side walls 533, which extends between the end walls 529 of the cavity 521 configured for receiving and releasably retaining the shank portion 512 of the metal belly hook 514.

Figure 13:
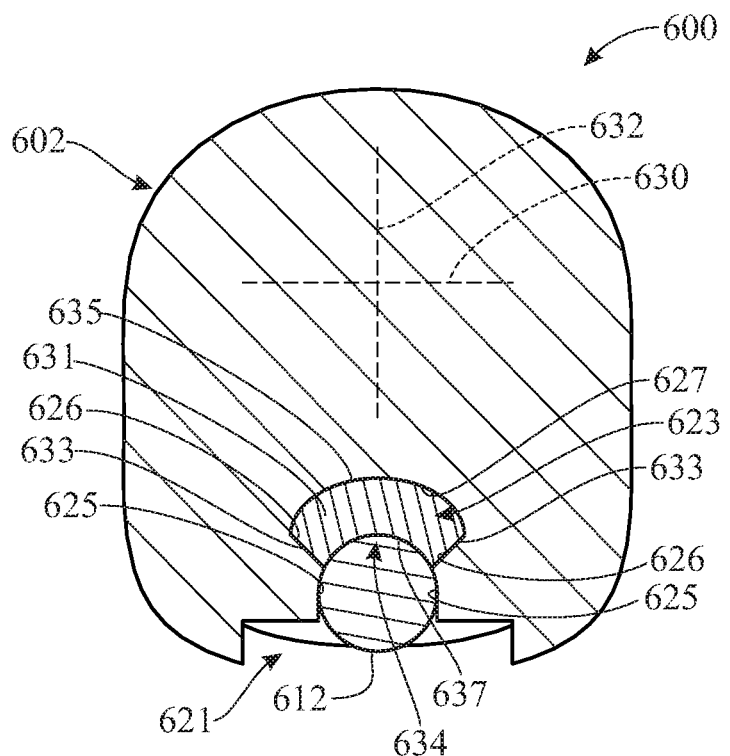
FIG. 13 presents an enlarged cross-section view of the fifth exemplary embodiment of the fishing lure, showing the further modified magnetic holder and cavity of FIG. 11.

Referring now to FIG. 13, there is illustrated a fifth exemplary embodiment of a fishing lure, generally designated reference numeral 600, generally the same as the fourth exemplary embodiment except for certain modifications which are described hereinafter. The same reference numerals, except for a change in the prefix of the reference numerals from "5" to "6", will indicate the same components in the fifth exemplary embodiment as in the fourth exemplary embodiment and thus these same components need not be described in detail in the following detailed description of the fourth exemplary embodiment in order to gain a complete understanding of the modified components of the fishing lure. Only the modifications will be identified with new reference numerals. The modifications of the fishing lure 600 are incorporated by the cavity 621 and the magnetic holder 623 in accordance with aspects of the present invention.

More particularly, the cavity 621 includes a pair of side walls 625, a pair of angled side walls 626, a top arcuate-shaped wall 627 (i.e. of a semi-cylindrical configuration), and a pair of end walls. The magnetic holder 623 is an elongated bar 631 having a pair of angled opposite side walls 633, an arcuate-shaped top wall 635, an arcuate-shaped bottom wall 637, and a pair of end walls. The angled opposite side walls 633 of the elongated bar 631 are spaced apart from each other and extending along the angled side walls 626 of the cavity 621. The arcuate-shaped top wall 635 of the elongated bar 631 extends between and interconnects upper ends of the opposite angled side walls 626 of the cavity 621 and extends along and below the arcuate-shaped top wall 627 of the cavity 621 and between the end walls thereof. The arcuate-shaped bottom wall 637 of the elongated bar 631 is spaced-apart from the arcuate-shaped top wall 635 and extends along and generally connects with a lower edge of one of the opposite angled side walls 626, which extends between the end walls of the cavity 621 so as to define an elongated diametrically magnetized channel 634 aligned with the bottom opening of the cavity 621 configured for receiving and releasably retaining the shank portion 612 of the metal belly hook (as is better seen on FIG. 11).

The metal belly hook may be single, double or treble hooks and the elongated diametrically magnetized channel may be for one specific size of hook shanks or for several sizes as a "one-fits-all" type. The diametrically magnetized configuration means that the magnetization is across the diameter or width of the magnetic holder and its channel. The north and south poles are respectively locate on the exterior and interior of the magnetic holder. The material of the magnetic holder may be neodym (NiCuNi) covered by a thin layer of varnish or sealant, such as black epoxy, to protect it. The pull force of the magnetic holder is strong enough to hold the hook in place at all trolling speeds, and light enough to release the hook when a fish strikes the lure. The magnetic holder may either be molded or placed in the cavity of the lure, or glued or fastened therein with any form of fasteners.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A fishing lure, comprising:
    a body comprising a front head portion, a rear tail portion, a top back portion, and a bottom belly portion;
    a cavity recessed within said body and having a bottom opening at a location extending between and intermediately of said bottom belly portion and said rear tail portion of said body, the cavity comprising
        a pair of outer side walls spaced apart from each other;
        a pair of inner side walls spaced apart from each other and spaced inwardly from and offset above said pair of outer side walls;
        a pair of outer top walls extending between and interconnecting upper edges of said pair of outer side walls with lower edges of said pair of inner side walls;
        an inner top wall extending between and interconnecting upper edges of said pair of inner side walls; and
        a pair of end walls spaced apart from each other and disposed at opposite ends of said outer and inner side walls and said outer and inner top walls; and
    a magnetic holder disposed in said cavity and assembled relative thereto to provide a channel of diametrically magnetized configuration aligned with said bottom opening of said cavity for receiving and releasably retaining a shank portion of a metal hook coupled at an end of said metal hook to said bottom belly portion of said body and extending within said channel so as to displace a point on an opposite end of the metal hook downwardly and forwardly away from said cavity and thereby in a stinger position relative to said body.

2. The fishing lure of claim 1 wherein said magnetic holder comprises:
    a pair of elongated side bars spaced apart from each other and being of rectangular configurations, each of said elongated side bars comprising
        an outer side wall extending along a respective one of said outer side walls of said cavity and between said end walls of said cavity,
        an inner side wall spaced from said outer side wall of said each elongated side bar and extending between said end walls of said cavity,
        a top wall extending between and interconnecting upper edges of said outer and inner side walls of said each elongated side bar and extending along and below a respective one of said outer top walls of said cavity and between said end walls of said cavity,
        a bottom wall spaced apart from said top wall of said each elongated side bar and extending between and interconnecting lower edges of said outer and inner side walls of said each elongated side bar and extending between said end walls of said cavity, and
        a pair of end walls spaced apart from each other and disposed at opposite ends of said outer and inner side walls and said top and bottom walls of said each elongated side bar and disposed at said pair of end walls of said cavity; and
    an elongated top bar of rectangular shape, said elongated top bar comprising
        a pair of opposite side walls spaced from each other and extending along said inner side walls of said cavity and between said end walls of said cavity,
        a top wall extending between and interconnecting upper edges of said opposite side walls of said elongated top bar and disposed below and extending along said inner top wall of said cavity and between said end walls of said cavity,
a bottom wall spaced from said top wall of said elongated top bar and extending between and interconnecting lower edges of said opposite side walls of said elongated top bar and extending between said end walls of said cavity, and
a pair of end walls spaced apart from each other and disposed at opposite ends of said opposite side walls and said top and bottom walls of said elongated top bar and disposed at said pair of end walls of said cavity;
wherein said elongated top bar is assembled between and offset above said pair of elongated side bars so as to define between said end walls of said cavity, said inner side walls of said elongated side bars and below said bottom wall of said elongated top bar said channel aligned with said bottom opening of said cavity for receiving and releasably retaining the shank portion of the metal hook.

3. A fishing lure, comprising:
a solid body comprising a front head portion, a rear tail portion, a top back portion, and a bottom belly portion such that a longitudinal axis extends between said front head portion and said rear tail portion of said solid body and a pair of orthogonal transverse axes extend across said solid body proximate said top back portion and said bottom belly portion thereof;
a top eye attached to and extending above said top back portion of said solid body at a location spaced from and intermediately between said front head portion and said rear tail portion of said solid body;
a bottom eye attached to and extending below said bottom belly portion of said solid body at a location opposite from said top eye and spaced from and intermediately between said front head portion and said rear tail portion of said solid body;
a cavity recessed within said solid body and having a bottom opening at a location extending between and intermediately of said bottom belly portion and said rear tail portion of said solid body, said cavity comprising:
a pair of outer side walls spaced apart from each other and extending in parallel with said longitudinal axis of said solid body;
a pair of inner side walls spaced apart from each other, spaced inwardly from and offset above said pair of outer side walls and extending in parallel with said longitudinal axis of said solid body;
a pair of outer top walls extending between and interconnecting upper edges of said pair of outer side walls with lower edges of said pair of inner side walls and extending in parallel with said longitudinal axis of said solid body;
an inner top wall extending between and interconnecting upper edges of said pair of inner side walls and extending in parallel with said longitudinal axis of said solid body; and
a pair of end walls spaced apart from each other and disposed at opposite ends of said outer and inner side walls and said outer and inner top walls, said end walls extending in parallel with said orthogonal transverse axes of said solid body;
wherein said cavity extends length-wise in parallel with said longitudinal axis of said solid body, and wherein said cavity extends width-wise and height-wise in parallel with said pair of orthogonal transverse axes of said solid body; and
a magnetic holder disposed in said cavity and assembled relative thereto to provide a channel of diametrically magnetized configuration aligned with said bottom opening of said cavity for receiving and releasably retaining a shank portion of a metal hook coupled at an end of said metal hook to said bottom eye and extending within said channel so as to displace a barbed portion of the metal hook and a point defined by the barbed portion downwardly and forwardly away from said cavity and thereby in a stinger position relative to said solid body.

4. The fishing lure of claim 3 wherein said magnetic holder comprises:
a pair of elongated side bars spaced apart from each other and being of rectangular configurations, each of said elongated side bars comprising
an outer side wall extending along a respective one of said outer side walls of said cavity and between said end walls of said cavity,
an inner side wall spaced from said outer side wall of said each elongated side bar and extending between said end walls of said cavity,
a top wall extending between and interconnecting upper edges of said outer and inner side walls of said each elongated side bar and extending along and below a respective one of said outer top walls of said cavity and between said end walls of said cavity,
a bottom wall spaced apart from said top wall of said each elongated side bar and extending between and interconnecting lower edges of said outer and inner side walls of said each elongated side bar and extending between said end walls of said cavity, and
a pair of end walls spaced apart from each other and disposed at opposite ends of said outer and inner side walls and said top and bottom walls of said each elongated side bar and disposed at said pair of end walls of said cavity; and
an elongated top bar of rectangular configuration, said elongated top bar comprising
a pair of opposite side walls spaced from each other and extending along said inner side walls of said cavity and between said end walls of said cavity,
a top wall extending between and interconnecting upper edges of said opposite side walls of said elongated top bar and disposed below and extending along said inner top wall of said cavity and between said end walls of said cavity,
a bottom wall spaced from said top wall of said elongated top bar and extending between and interconnecting lower edges of said opposite side walls of said elongated top bar and extending between said end walls of said cavity, and
a pair of end walls spaced apart from each other and disposed at opposite ends of said opposite side walls and said top and bottom walls of said elongated top bar and disposed at said pair of end walls of said cavity;
wherein said elongated top bar is assembled between and offset above said pair of elongated side bars so as to define between said end walls of said cavity, said inner side walls of said elongated side bars and below said bottom wall of said elongated top bar said channel aligned with said bottom opening of said cavity for receiving and releasably retaining the shank portion of the metal hook.

5. A fishing lure, comprising:
a solid body comprising a front head portion, a rear tail portion, a top back portion, and a bottom belly portion such that a longitudinal axis extends between said front head portion and said rear tail portion of said solid body and a pair of orthogonal transverse axes extend across said solid body proximate said top back portion and said bottom belly portion thereof;
a top eye attached to and extending above said top back portion of said solid body at a location spaced from and intermediately between said front head portion and said rear tail portion of said solid body, said top eye for connecting a fishing line to said solid body;
a bottom eye attached to and extending below said bottom belly portion of said solid body at a location opposite from said top eye and spaced from and intermediately between said front head portion and said rear tail portion of said solid body;
a metal hook comprising
  at least one shank portion coupled at one end thereof to said bottom eye and extending therefrom, and
  a barbed portion at a terminal end of said shank portion and having a point opposite said one end of said shank portion;
a cavity recessed within said solid body and having a bottom opening at a location extending between and intermediately of said bottom belly portion and said rear tail portion of said solid body, said cavity comprising
  a pair of outer side walls spaced apart from each other and extending in parallel with said longitudinal axis of said solid body;
  a pair of inner side walls spaced apart from each other, spaced inwardly from and offset above said pair of outer side walls and extending in parallel with said longitudinal axis of said solid body;
  a pair of outer top walls extending between and interconnecting upper edges of said pair of outer side walls with lower edges of said pair of inner side walls and extending in parallel with said longitudinal axis of said solid body;
  an inner top wall extending between and interconnecting upper edges of said pair of inner side walls and extending in parallel with said longitudinal axis of said solid body; and
  a pair of end walls spaced apart from each other and disposed at opposite ends of said outer and inner side walls and said outer and inner top walls, said end walls extending in parallel with said orthogonal transverse axes of said solid body; and
a magnetic holder disposed in said cavity and assembled relative thereto to provide a channel of diametrically magnetized configuration aligned with said bottom opening of said cavity for receiving and releasably retaining said shank portion of said metal hook extending within said channel so as to displace said barbed portion of said metal hook and said point of said barbed portion downwardly and forwardly away from said cavity and thereby in a stinger position relative to said solid body.

6. The fishing lure of claim 5 wherein said magnetic holder comprises:
a pair of elongated side bars spaced apart from each other and being of rectangular configuration, each of said elongated side bars comprising
  an outer side wall extending along a respective one of said outer side walls of said cavity and between said end walls of said cavity,
  an inner side wall spaced from said outer side wall of said each elongated side bar and extending between said end walls of said cavity,
  a top wall extending between and interconnecting upper edges of said outer and inner side walls of said each elongated side bar and extending along and below a respective one of said outer top walls of said cavity and between said end walls of said cavity,
  a bottom wall spaced apart from said top side wall of said each elongated side bar and extending between and interconnecting lower edges of said outer and inner side walls of said each elongated side bar and extending between said end walls of said cavity, and
  a pair of end walls spaced apart from each other and disposed at opposite ends of said outer and inner side walls and said top and bottom walls of said each elongated side bar and disposed at said pair of end walls of said cavity; and
an elongated top bar of rectangular configuration, said elongated top bar comprising
  a pair of opposite side walls spaced from each other and extending along said inner side walls of said cavity and between said end walls of said cavity,
  a top wall extending between and interconnecting upper edges of said opposite side walls of said elongated top bar and disposed below and extending along said inner top wall of said cavity and between said end walls of said cavity,
  a bottom wall spaced from said top wall of said elongated top bar and extending between and interconnecting lower edges of said opposite side walls of said elongated top bar and extending between said end walls of said cavity, and
  a pair of end walls spaced apart from each other and disposed at opposite ends of said opposite side walls and said top and bottom walls of said elongated top bar and disposed at said pair of end walls of said cavity;
wherein said elongated top bar is assembled between and offset above said pair of elongated side bars so as to define between said end walls of said cavity, said inner side walls of said elongated side bars and below said bottom wall of said elongated top bar said channel aligned with said bottom opening of said cavity for receiving and releasably retaining said shank portion of said metal hook.

7. The fishing lure of claim 5 wherein said bottom opening of said cavity has an inclined orientation relative to said longitudinal and orthogonal transverse axes of said solid body.

* * * * *